(12) United States Patent
Biksacky

(10) Patent No.: US 12,612,988 B2
(45) Date of Patent: Apr. 28, 2026

(54) TUBING CONNECTION ASSEMBLY

(71) Applicant: Flownamics Analytical Instruments, Inc., Madison, WI (US)

(72) Inventor: Michael Biksacky, Madison, WI (US)

(73) Assignee: Flownamics Analytical Instruments, Inc., Madison, WI (US)

( * ) Notice: Subject to any disclaimer, the term of this patent is extended or adjusted under 35 U.S.C. 154(b) by 0 days.

(21) Appl. No.: 18/423,643

(22) Filed: Jan. 26, 2024

(65) Prior Publication Data

US 2024/0255087 A1 Aug. 1, 2024

Related U.S. Application Data

(60) Provisional application No. 63/441,507, filed on Jan. 27, 2023.

(51) Int. Cl.
| | |
|---|---|
| *F16L 37/098* | (2006.01) |
| *F16L 37/133* | (2006.01) |
| *F16L 41/02* | (2006.01) |

(52) U.S. Cl.
CPC ......... *F16L 37/0985* (2013.01); *F16L 37/133* (2013.01); *F16L 41/021* (2013.01); *F16L 41/023* (2013.01); *F16L 2201/60* (2013.01)

(58) Field of Classification Search
CPC ..... F16L 33/223; F16L 33/225; F16L 33/227; F16L 37/0985; F16L 37/133; F16L 37/20; F16L 2201/60; F16L 41/023; A61M 2039/1044; A61M 2039/1077; A61M 39/10; A61M 2039/1027; A61M 2039/1083; A61M 2039/1088
See application file for complete search history.

(56) References Cited

U.S. PATENT DOCUMENTS

| | | | | | |
|---|---|---|---|---|---|
| 4,946,200 | A | * | 8/1990 | Blenkush | F16L 33/225 |
| | | | | | 285/38 |
| 6,338,506 | B1 | * | 1/2002 | Kubota | F16L 37/138 |
| | | | | | 285/322 |
| 6,641,177 | B1 | * | 11/2003 | Pinciaro | F16L 33/225 |
| | | | | | 285/257 |
| 7,686,349 | B2 | * | 3/2010 | Guest | F16L 37/091 |
| | | | | | 285/321 |
| 8,177,772 | B2 | * | 5/2012 | Christensen | A61M 39/10 |
| | | | | | 604/536 |
| 9,771,708 | B2 | * | 9/2017 | Flessa | F16L 33/225 |
| 10,563,802 | B2 | * | 2/2020 | Felstead | F16L 33/225 |
| 11,938,093 | B2 | * | 3/2024 | Spohn | A61M 5/1782 |

(Continued)

OTHER PUBLICATIONS

Photograph #1 is a photograph of a tubing connector.
Photograph #2 is a photograph of a tubing connector.

*Primary Examiner* — David Bochna
(74) *Attorney, Agent, or Firm* — Boardman & Clark LLP

(57) ABSTRACT

A tubing fitting, connector and/or adaptor assembly for fluidly coupling tubing together, the assembly comprising a tubular member extending from a hub, the tubular member having an outer diameter adapted to engage an inner diameter of a tubing; and a female fitting comprising a body member having an inner diameter and a protrusion adapted to receive an outer diameter of the tubing, whereby the first female fitting includes cantilever arms for creating a cantilever joint with notches or openings in the hub to retain the hub relative to the female member and the tubing.

13 Claims, 8 Drawing Sheets

(56) References Cited

U.S. PATENT DOCUMENTS

| | | | |
|---|---|---|---|
| 2015/0145243 A1* | 5/2015 | Dude | F16L 37/0982 |
| | | | 285/308 |
| 2015/0260325 A1* | 9/2015 | Quick | A61M 39/1011 |
| | | | 285/326 |
| 2018/0235799 A1* | 8/2018 | Binnendyk | A61M 39/1011 |
| 2021/0131596 A1* | 5/2021 | Mitrovic | F16L 33/225 |

* cited by examiner

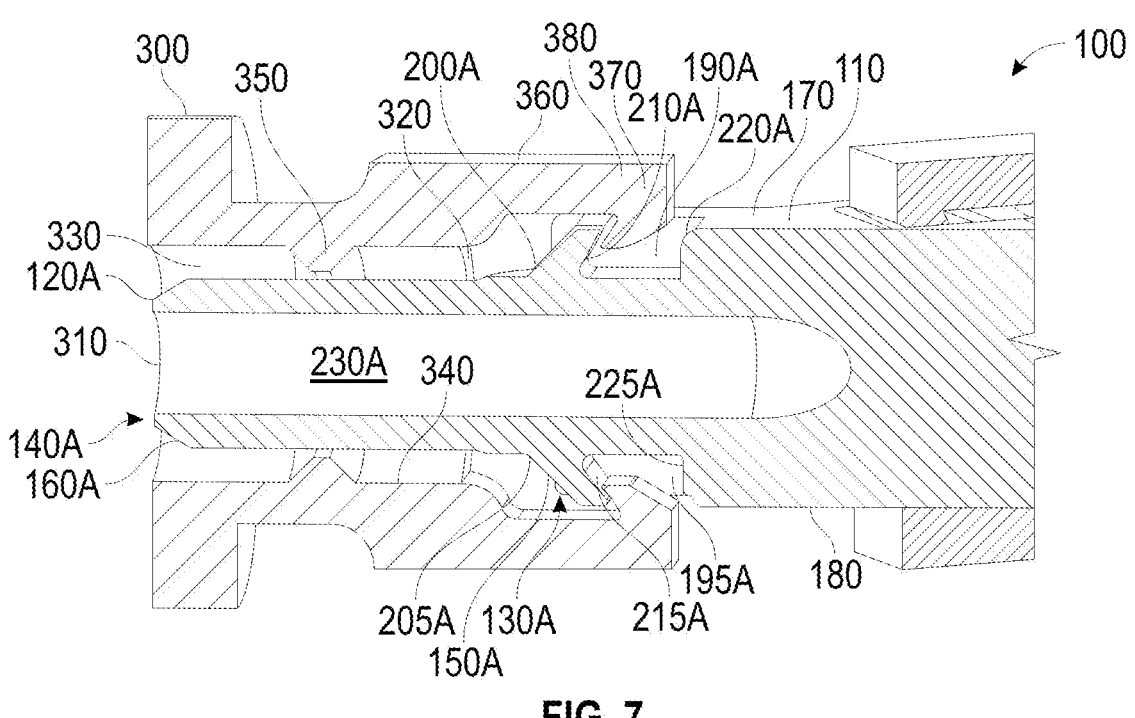
FIG. 7
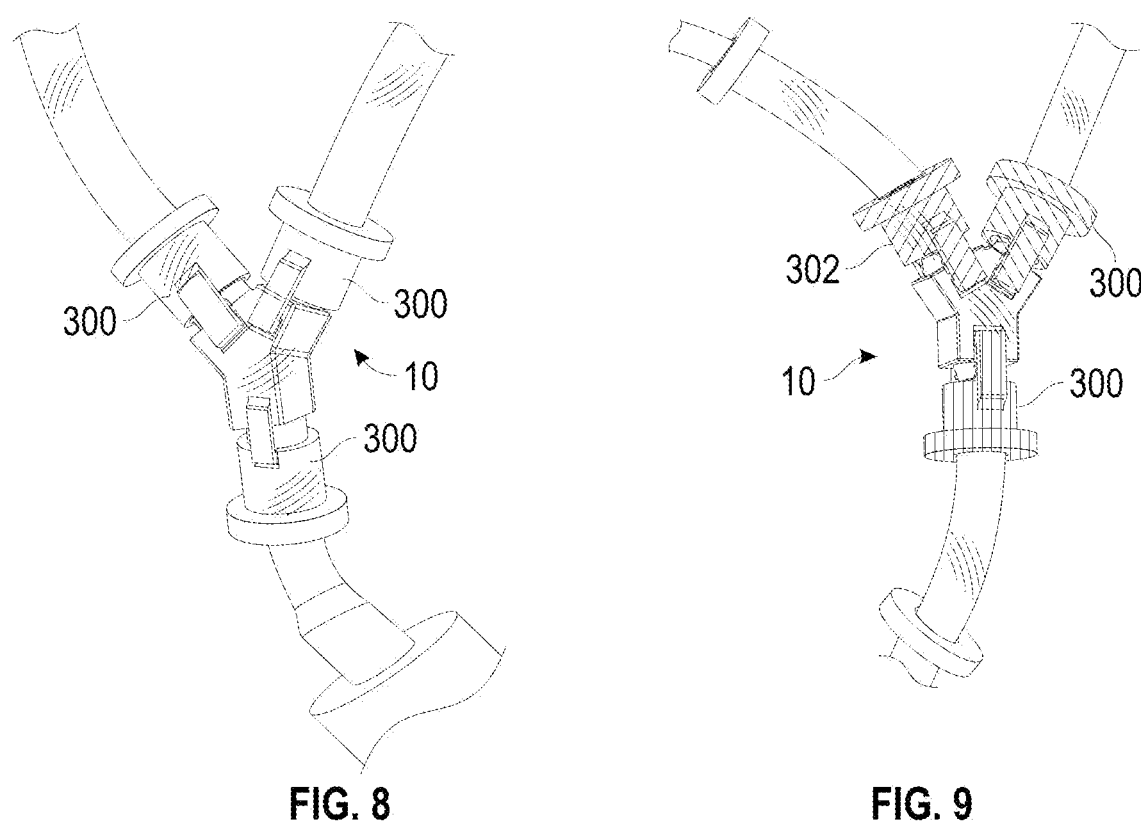
FIG. 8          FIG. 9

TUBING CONNECTION ASSEMBLY

RELATED APPLICATIONS

This application claims priority to U.S. Provisional Patent Application Ser. No. 63/441,507, filed Jan. 27, 2023, entitled "Tubing Connection Assembly," the entirety of which is hereby incorporated by reference herein.

FIELD

The present inventions relate to the field of tubing fittings, connectors and/or adaptors. The present inventions more specifically relate to the field of tubing fittings, connectors and/or adaptors for general, medical and/or laboratory use, and/or used in bioprocess and bioreactor sampling systems.

BACKGROUND

Tubing fittings, connectors and/or adaptors (e.g., tubing fittings, connectors and/or adaptors having barbed fittings) are known. However, known tubing fittings, connectors and/or adaptors are insufficient. For example, known fittings, connectors and/or adaptors utilize rigid tubular bodies having peripheral gripping barbs for retaining tubing relative to the barbs. Over time, the tubing can loosen and disconnect or allow leaks between the barbs and the tubing, making the reliability of such tubing fittings, connectors and/or adaptors less than optimal.

Known apparatus for addressing the shortcomings of barbed tubing fittings, connectors and/or adaptors include heat shrink bands and zip or cable ties. Example tubing connectors and heat shrink bands are illustrated in FIG. 1. Example tubing connectors and zip or cable ties are illustrated in FIG. 2. Such known apparatus also have shortcomings and are less than optimal. For example, both apparatus lack reliability and take time to assemble. In addition, zip ties can only be adjusted incrementally, and such incremental adjustments allows under or over tightening the zip ties which can damage the connectors, or provide less the optimal tightening and lead to disconnection and leaks. Zip ties also have protrusions (e.g. tie heads and/or cable tie ends) that can damage system components (e.g., bags), take up needed space, and/or prevent their use in confined spaces between such components. Zip or cable ties also tend to have a gap near the tie had and the cable tie that is not optimal for sealing tubing and a fitting, connector and/or adaptor.

SUMMARY

There is a need for a tubing fitting, connector and/or adaptor assembly that does not rely solely on barbed fittings and/or heat shrink bands and/or zip ties.

There is a need for a tubing fitting, connector and/or adaptor assembly that is relatively easier to assemble than known tubing connectors.

There is a need for a tubing fitting, connector and/or adaptor assembly that may be scaled to a variety of tubing diameters and sizes.

There is a need for a tubing fitting, connector and/or adaptor assembly that may readily used in multiple configurations (e.g., linear configurations, Y-shaped configurations, T-shaped configurations, luer configurations, etc.)

There is a need for a tubing fitting, connector and/or adaptor assembly that can be colored and/or color coded (e.g., to help distinguish flows).

There is a need for a tubing fitting, connector and/or adaptor assembly that does not include protrusions or edges or the like that can catch or damage components (e.g., bags) of systems utilizing such tubing fitting, connector and/or adaptor assembly.

There is a need for a tubing fitting, connector and/or adaptor assembly that does not include protrusions or the like that can unnecessarily add to the profile of the tubing fitting, connector and/or adaptor assembly to take up space and/or prevent the use of the tubing fitting, connector and/or adaptor assembly in confined spaces.

There is also a need for a tubing fitting, connector and/or adaptor assembly that can provide substantially consistent pressure around the outside diameter of tubing to help provide a more optimal seal between tubing and the tubing fitting, connector and/or adaptor assembly.

Accordingly, new and improved tubing fitting, connector and/or adaptor assemblies are provided.

Accordingly, a tubing fitting, connector and/or adaptor assembly is provided that does not require barbed fittings and/or heat shrink bands and/or zip ties.

Accordingly, a tubing fitting, connector and/or adaptor assembly is provided that is relatively easier to assemble than known tubing connectors.

Accordingly, a tubing fitting, connector and/or adaptor assembly is provided that may be scaled to a variety of tubing diameters sizes.

Accordingly, a tubing fitting, connector and/or adaptor assembly is provided that may readily used in multiple configurations (e.g., linear configurations, Y-shaped configurations, T-shaped configurations, luer configurations, etc.)

Accordingly, a tubing fitting, connector and/or adaptor assembly is provided herein that can be colored and/or color coded (e.g., to help distinguish flows).

Accordingly, a tubing fitting, connector and/or adaptor assembly is provided herein that does not include protrusions or edges or the like that can catch or damage components (e.g., bags) of systems utilizing such tubing fitting, connector and/or adaptor assembly.

Accordingly, a tubing fitting, connector and/or adaptor assembly is provided herein that does not include protrusions or the like that can unnecessarily add to the profile of the tubing fitting, connector and/or adaptor assembly to take up space and/or prevent the use of the tubing fitting, connector and/or adaptor assembly in confined spaces.

Accordingly, a tubing fitting, connector and/or adaptor assembly is provided herein that can provide substantially consistent pressure around the outside diameter of tubing to help provide a more optimal seal between tubing and the tubing fitting, connector and/or adaptor assembly.

According, a tubing fitting, connector and/or adaptor assembly is provided herein, the assembly comprising: a hub having opposing top and bottom surfaces, a first top notch defined in the top surface and a first bottom notch defined in the bottom surface; a first tubular member extending from the hub, the first tubular member having an outer diameter adapted to engage an inner diameter of a section of first tubing; a first female fitting comprising a body member having first and second cantilever extending arms extending from the body member; whereby the body member of the first female fitting has opposing first and second receiving ends, an inner diameter defining a cavity connecting the first and second receiving ends, and a protrusion protruding radially into the cavity from the inner diameter; and whereby the inner diameter of the body member of the first female fitting is adapted to receive an outer diameter of the section of first tubing engaged by the outer diameter of the first tubular member, and whereby first and second extending arms of the first female fitting each have a hook coupled thereto adapted to releasably engage the first top notch and the first bottom notch to help retain the first female fitting relative to the first tubular member.

Accordingly, a method of fluidly coupling ends of tubing is provided, the method comprising: providing a female fitting, the female fitting having a body defining a cavity or channel and a receiving end, a protrusion extending from the body into the cavity or channel, and cantilever arms extending from the body, the cantilever arms having a cantilever hook or tab extending from the arms; providing a male fitting having a hub having opposing surfaces with a notch defined in each surface, and a tubular member extending from the hub; providing tubing having an end portion in the cavity or channel defined by the female fitting; providing an inner diameter of the end portion of the tubing around an outside diameter of the tubular member; and releasably coupling the male fitting, female fitting, and tubing relative to each other by generally aligning the tubular member with the receiving end of the female fitting, inserting the tubular member and tubing end portion into the receiving end of the female fitting and moving the male and female fittings relatively closer together until the cantilever hooks or tabs of the cantilever arms seat into the notches defined in the opposing surfaces of the hub of the male fitting, and the protrusion of the female fitting and the outside diameter of the tubing member oppose each other to compress the end portion of the tubing in a radial direction to help clamp the end portion of the tubing relative to the tubular member.

BRIEF DESCRIPTION OF DRAWINGS

Various examples of embodiments of the systems, devices, and methods according to this invention will be described in detail, with reference to the following figures, wherein:

FIG. 7 illustrates a partial sectional view of the tubing fitting, connector and/or adaptor assembly of FIG. 3 taken along section 7-7, according to various examples of embodiments;

FIG. 8 illustrates a perspective view of the tubing fitting and/or connector assembly of FIG. 3 coupled to tubing, according to various examples of embodiments;

FIG. 9 illustrates a perspective view of the tubing fitting and/or connector assembly of FIG. 3 coupled to tubing, according to various examples of embodiments;

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to FIGS. 3-18, example embodiments of tubing fitting, connector and/or adaptor assemblies are provided.

Referring more specifically to FIGS. 3-5 and 7, a tubing fitting and/or connector assembly 10 according to various examples of embodiments is illustrated. In various embodiments, tubing connector assembly 10 includes a first or male fitting or connector member 100 and one or more second or female fitting or connector members 300.

Figure 1:
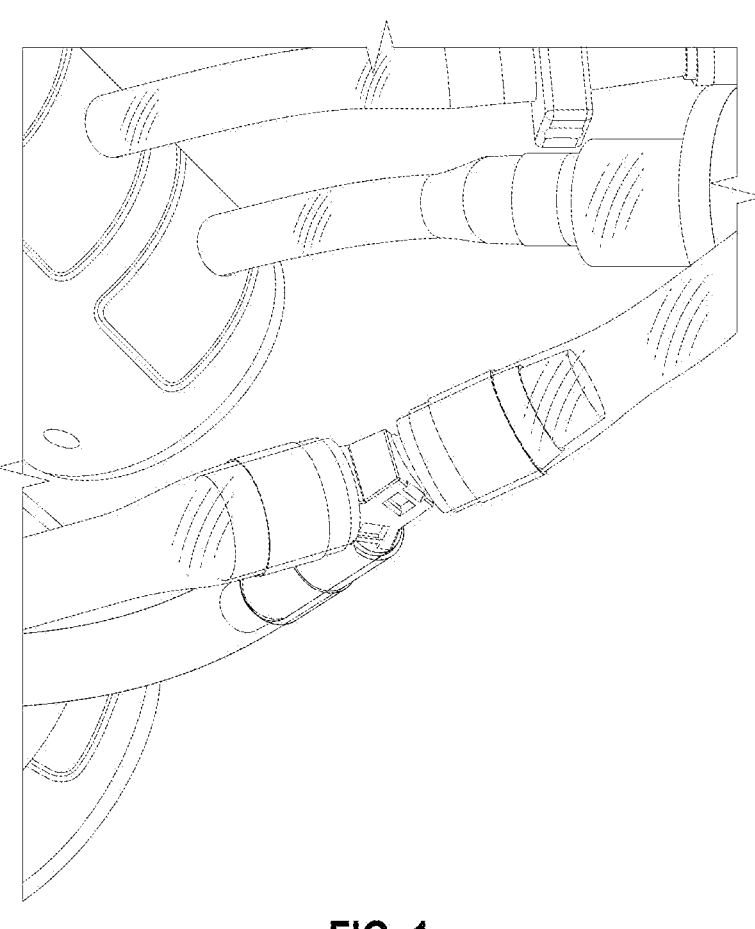
FIG. 1 illustrates known tubing connectors utilizing barbed fittings and heat shrink bands.
Figure 2:
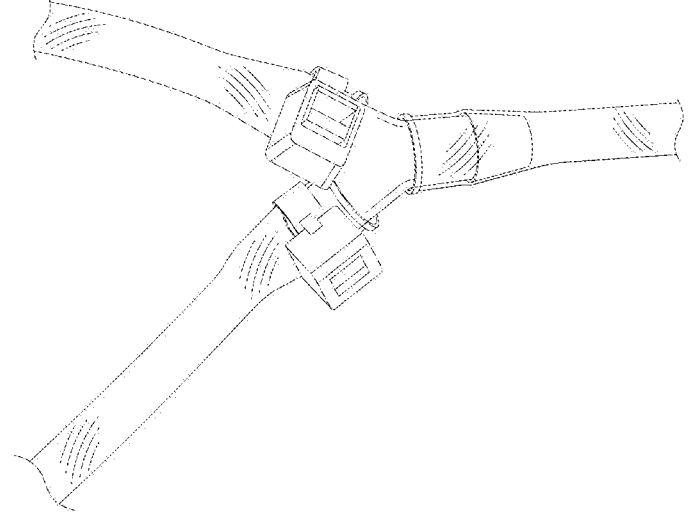
FIG. 2 illustrates known tubing connectors utilizing barbed fittings and zip ties.
Figure 3:
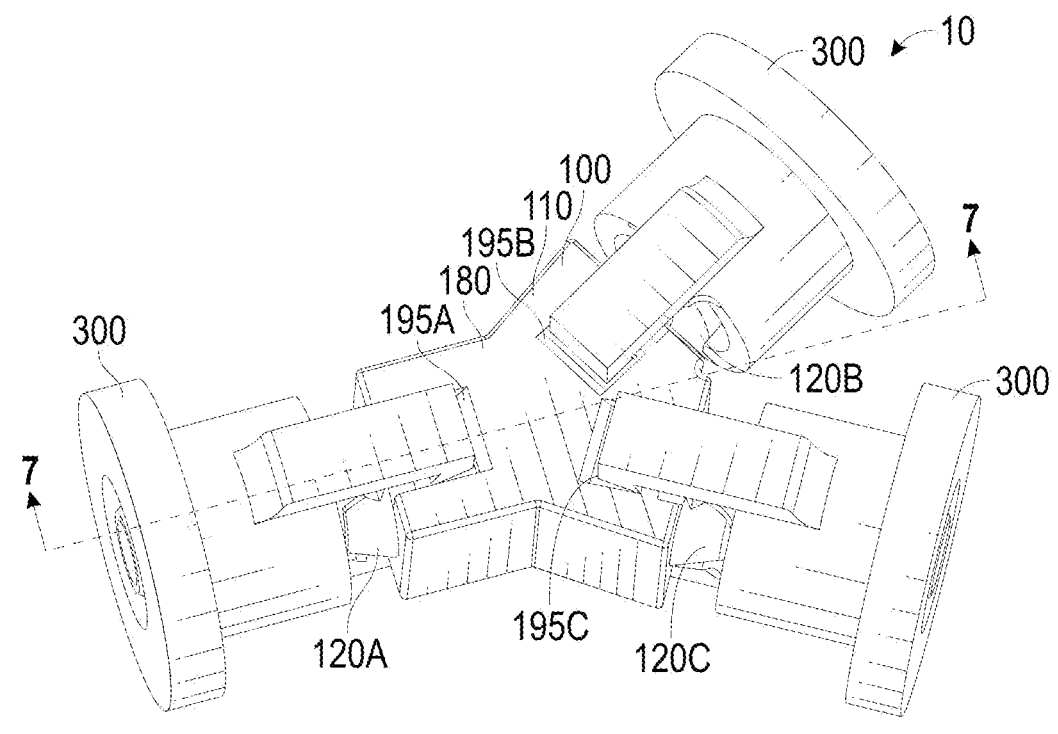
FIG. 3 illustrates a perspective bottom view of a tubing fitting and/or connector assembly, according to various examples of embodiments.
Figure 4:
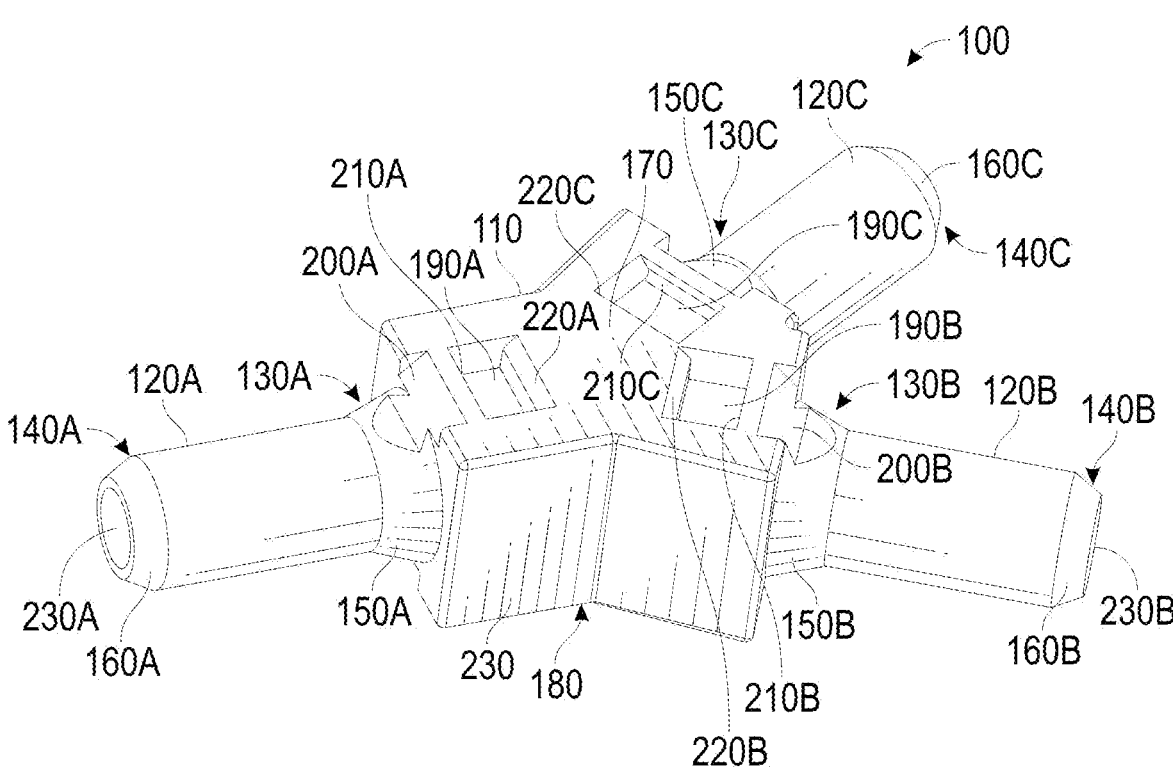
FIG. 4 illustrates a perspective top view of a first fitting or connector member of the tubing fitting and/or connector assembly of FIG. 3, according to various examples of embodiments.

Referring more specifically to FIGS. 4 and 7, in various examples of embodiments, first fitting or connector member 100 includes a hub or body member 110 and a first tubular member 120A. In various embodiments, first tubular member 120A has a proximate end 130A coupled to body member 110 and a distal end 140A. In various embodiments, proximate end 130A includes a first tapered portion 150A having an outer diameter that tapers from body member 110 toward first tubular member 120A. In various embodiments, distal end 140A of tubular member 120A includes a second tapered portion 160A having an outer diameter that tapers toward distal end 140A and/or away from proximate end 130A. In various embodiments, first and second tapered portions 150A and 160A extend around or at least partially around outer diameter of first tubular member 120A.

In various embodiments, body member 110 includes a top face or surface 170 and a bottom face or surface 180. In various embodiments at least one first top notch 190A is defined by body member 110 (e.g., in top face 170). In various embodiments, first top notch 190A is defined in top face 170 near proximate end 130A of first tubular member 120A. In various embodiments, first top notch 190A is defined by body member 110 (e.g., in top face 170) near proximate end 130A of first tubular member 120A.

In various embodiments, a first top bevel or radius 200A is defined in body member 110. In various embodiments, first top bevel 200A is defined in top face or surface 170 and/or first tapered portion 150A.

In various embodiments, first top notch 190A includes a first wall 210A and a second wall 220A. In various embodiments, and as shown in FIG. 7, at least a portion of first wall 210A tapers and/or is beveled in same or similar direction or angle as first top bevel 200A. In various embodiments, and as shown in FIGS. 4 and 7, at least a portion of second wall 220A tapers and/or is beveled in same or similar direction or angle as first top bevel 200A.

Referring more specifically again to FIGS. 3 and 7, in various embodiments, at least one first bottom notch 195A is defined by body member 110 (e.g., in bottom face 180). In various embodiments, first bottom notch 195A is defined in bottom face 180 near proximate end 130A of first tubular member 120A. In various embodiments, first bottom notch 195A is defined by body member 110 (e.g., in bottom face 180) near proximate end 130A of first tubular member 120A.

In various embodiments, a first bottom bevel 205A is defined in body member 110. In various embodiments, first bottom bevel 205A is defined in bottom face or surface 180 and/or first tapered portion 150A.

In various embodiments, first bottom notch 195A includes a first wall 215A and a second wall 225A. In various embodiments, at least a portion of first wall 215A tapers and/or is beveled in same or similar direction or angle as first bevel 205A. In various embodiments, at least a portion of second wall 225A tapers and/or is beveled in same or similar direction or angle as first bevel 200A.

In various examples of embodiments, and referring again to FIG. 4, first fitting or connector member 100 includes a second tubular member 120B. In various embodiments, tubular members 120A and 120B define one or more conduits or lumens (e.g., cylindrical lumens 230A and/or 230B) that are fluidly connected.

In various embodiments, second tubular member 120B has a proximate end 130B coupled to body member 110 and a distal end 140B. In various embodiments, proximate end 130B includes a first tapered portion 150B having an outer diameter that tapers from body member 110 toward second tubular member 120B. In various embodiments, distal end 140B of second tubular member 120B includes a second tapered portion 160B having an outer diameter that tapers toward distal end 140B. In various embodiments, first and second tapered portions 140B and 160B extend around or at least partially around outer diameter of second tubular member 120B.

In various embodiments, a second top notch 190B is defined by body member 110 (e.g., in top face 170). In various embodiments, second top notch 190B is defined in first face 170 near proximate end 130B of second tubular member 120B. In various embodiments, second top notch 190B is defined by body member 110 (e.g., in top face 170) near proximate end 130B of second tubular member 120B.

In various embodiments, a second bevel or radius 200B is defined in body member 110. In various embodiments, second bevel 200B is defined in top face or surface 170 and/or first tapered portion 150B of second tubular member 120B.

In various embodiments, second top notch 190B includes a first wall 210B and a second wall 220B. In various embodiments, at least a portion of first wall 210B tapers and/or is beveled in same or similar direction or angle as second bevel 200B. In various embodiments, and as shown in FIG. 4, at least a portion of second wall 220B tapers and/or is beveled in same or similar direction or angle as second bevel 200B.

Referring more specifically again to FIG. 3, in various embodiments, at least one second bottom notch 195B is defined by body member 110 (e.g., in bottom face 180). In various embodiments, second bottom notch 195B is defined in bottom face 180 near the proximate end of second tubular member 120B. In various embodiments, second bottom notch 195B is defined by body member 110 (e.g., in bottom face 180) near the proximate end of second tubular member 120B.

Referring again to FIG. 4, in various embodiments, a first bottom bevel is defined in body member 110. In various embodiments, the first bottom bevel is defined at least partially in bottom face or surface 180.

In various examples of embodiments, first fitting or connector member 100 includes a third tubular member 120C. In various embodiments, tubular members 120A and 120C define one or more conduits or lumens (e.g., cylindrical lumens) that are fluidly connected.

In various embodiments, third tubular member 120C has a proximate end 130C coupled to body member 110 and a distal end 140C. In various embodiments, proximate end 130C includes a first tapered portion 150C having an outer diameter that tapers from body member 110 toward third tubular member 120C. In various embodiments, distal end 140C of third tubular member 120C includes a second tapered portion 160C having an outer diameter that tapers toward distal end 140C. In various embodiments, first and second tapered portions 140C and 160C extend around outer diameter of third tubular member 120C.

In various embodiments, a third top notch 190C is defined by body member 110 (e.g., in first face 170). In various embodiments, third top notch 190C is defined in first face 170 near proximate end 130C of third tubular member 120C. In various embodiments, third top notch 190C is defined by body member 110 (e.g., in first face 170) near proximate end 130C of third tubular member 120C.

In various embodiments, a third bevel 200C is defined in body member 110. In various embodiments, third bevel 200C is defined in first face or surface 170 and/or first tapered portion 160C of third tubular member 120C.

In various embodiments, third notch 190C includes a first wall 210C and a second wall 220C. In various embodiments, and as shown in FIGS. 4 and 7, at least a portion of first wall 210C tapers and/or is beveled in same or similar direction or angle as third bevel 200C. In various embodiments, and as shown in FIGS. 4 and 7, at least a portion of second wall 220C tapers and/or is beveled in same or similar direction or angle as third bevel 200C.

Referring more specifically again to FIG. 3, in various embodiments, at least one third bottom notch 195C is defined by body member 110 (e.g., in bottom face 180). In various embodiments, third bottom notch 195C is defined in bottom face 180 near the proximate end of third tubular member 120C. In various embodiments, third bottom notch 195C is defined by body member 110 (e.g., in bottom face 180) near the proximate end of third tubular member 120C.

In various embodiments, a first bottom bevel is defined in body member 110. In various embodiments, the first bottom bevel is defined at least partially in bottom face or surface 180.

Figure 5:
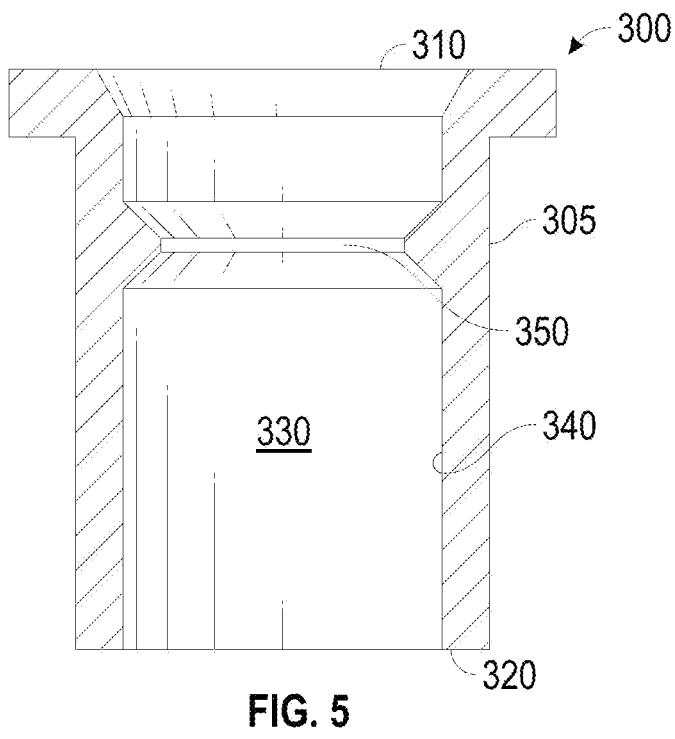
FIG. 5 illustrates a sectional view of a second or female fitting or connector member of the tubing fitting and/or connector assembly of FIG. 3, according to various examples of embodiments.

Referring now to FIG. 5, an example embodiment of a second or female fitting or connector member 300 is illustrated. In various examples of embodiments, female fitting 300 includes a body member 305 having opposing first and second receiving ends 310/320 connected by a cavity or channel 330 formed in and/or defined by female fitting 300. In various embodiments, cavity or channel 330, at least near first receiving end 310, is adapted to receive an outer circumference of an end of tubing (not shown). In various embodiments, female fitting 300 includes an inner diameter 340 helping define the cavity or channel 330. In various embodiments, at least one protrusion 350 is coupled to and/or formed in and/or around inner diameter 340. In various embodiments, protrusion 350 (e.g., a fixed ring-shaped protrusion) protrudes inward along a radial direction formed in cavity or channel 330 formed or defined by female fitting 300. The protrusion 350 may extend entirely or partially around inner diameter 340 of female fitting 300.

Referring more specifically to FIG. 7, in various embodiments, female fitting 300 also includes first and second (e.g., opposing) cantilever flexing and/or resilient arms or clips 360 extending laterally from the body member with a cantilever snap tab or hook 370 (e.g., near a distal end 380 of each cantilever arm 360) coupled thereto. In various embodiments, cantilever snap tabs or hooks 370 are adapted to engage notches defined in or by body member 110 (e.g., notches 190A/195A).

Figure 6:
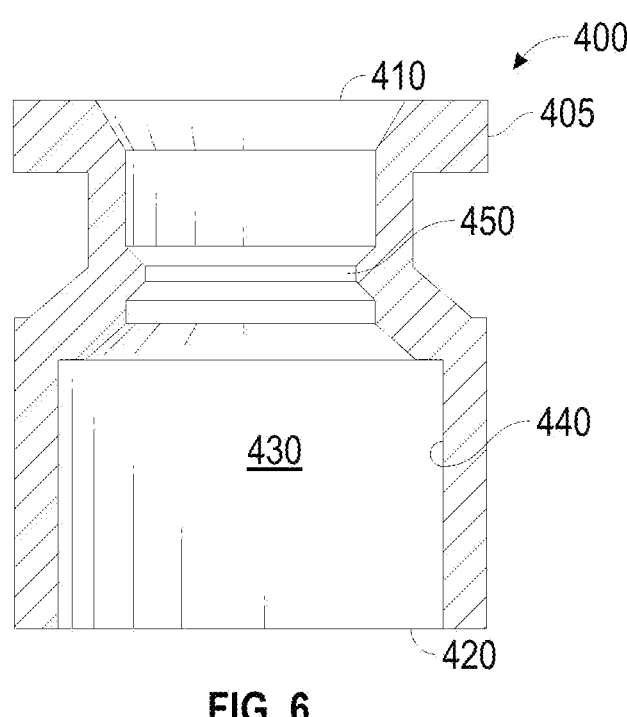
FIG. 6 illustrates a sectional view of a second fitting or connector member, according to various examples of embodiments.

Referring now to FIG. 6, another example embodiment of a second or female fitting or connector member 400 is illustrated. In various examples of embodiments, female fitting 400 includes a body member 405 having opposing first and second receiving ends 410/420 connected by a cavity or channel 430 formed in and/or defined by female fitting 400. In various embodiments, cavity or channel 430, at least near first receiving end 410, is adapted to receive an outer circumference of an end of tubing (not shown). In various embodiments, female fitting 400 includes an inner diameter 440 helping define the cavity or channel 430. In various embodiments, at least one protrusion 450 is coupled to and/or formed in and/or around inner diameter 440. In various embodiments, protrusion 450 (e.g., a fixed ring-shaped protrusion) protrudes inward along a radial direction formed in cavity or channel 430 formed or defined by female fitting 400. Protrusion 450 may extend entirely or partially around the inner diameter of the female fitting. In various embodiments, inner diameter 445 helping define cavity or channel 435 is variable.

As illustrated in FIGS. 3-5 and 7, in various embodiments, male connector 100 includes three tubular members 120A/120B/120C extending from hub 110 (e.g., to generally form a Y-shape or Y-configuration). However, any number of shapes or configurations are envisioned. For example, and referring now to FIGS. 10-11 a tubing, fitting and/or adaptor connection assembly 20 may include a first fitting or connection member 500 including a hub 510, multiple tubular members (e.g., 520A, 520B and 520C) (e.g., with two aligned linearly and/or on a shared axis, and the other perpendicularly (e.g., in a T-shape or configuration) and associated female fittings 300 adapted to be removably coupled relative thereto.

In various embodiments, one or more components of the tubing connector assemblies disclosed herein may be colored differently relative to other components. For example, and referring to FIGS. 8-9, one or more female receivers 300 may be color coded to help distinguish fluids and/or fluid flows in each.

Figures 10, 11, 12:
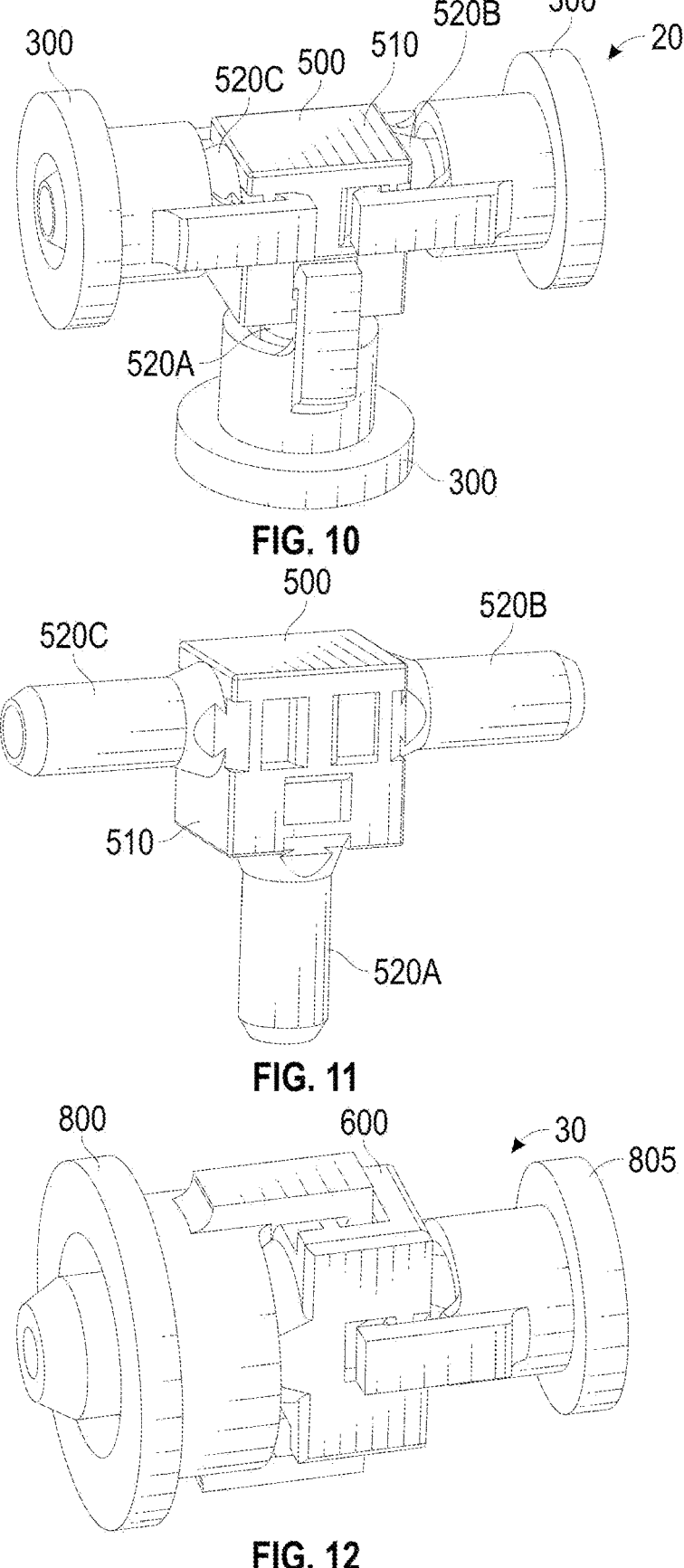
FIG. 10 illustrates a perspective view of a tubing fitting and/or connector assembly, according to various examples of embodiments.
FIG. 11 illustrates a perspective view of a first fitting or connector member of the tubing fitting and/or connector assembly of FIG. 10, according to various examples of embodiments.
FIG. 12 illustrates a perspective view of a tubing fitting and/or connector assembly, according to various examples of embodiments.
Figure 13:
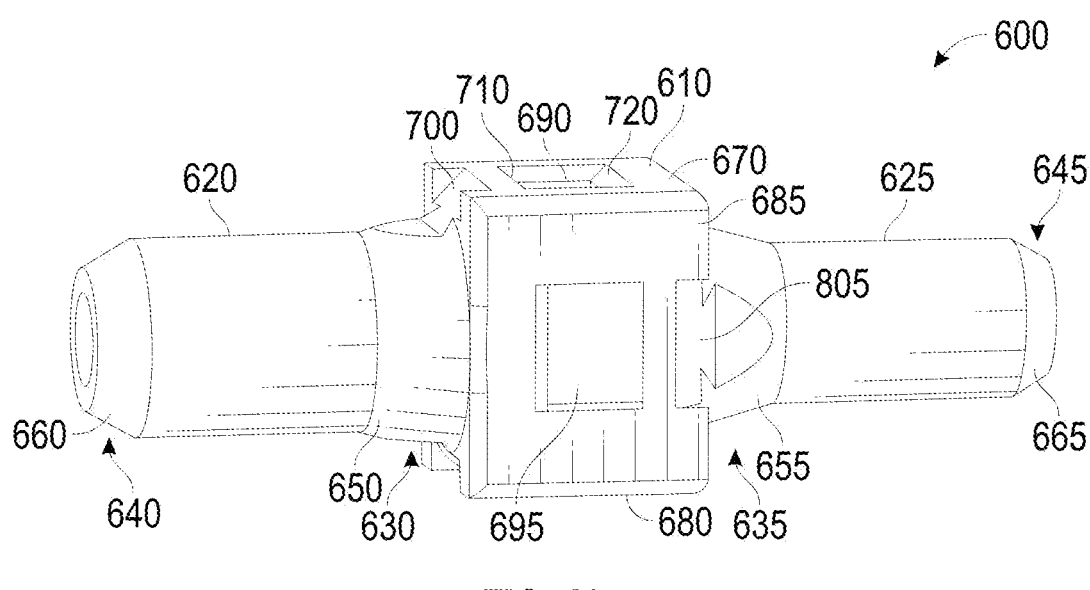
FIG. 13 illustrates a perspective view of a first fitting or connector member of the tubing fitting and/or connector assembly of FIG. 12, according to various examples of embodiments.

It should be appreciated that notches may be defined in other or alternative or additional faces or surfaces of a body member. Referring now to FIGS. 12-13, a tubing fitting, adaptor and/or connector assembly 30 according to various examples of embodiments is illustrated. In various embodiments, tubing connector assembly 30 includes a first male fitting or connector member 600, first female fitting or connector member 800, and second female fitting or connector member 805.

Referring more specifically to FIG. 13, in various examples of embodiments, first fitting or connector member 600 includes a hub or body member 610 and a first tubular member 620. In various embodiments, first tubular member 620 has a proximate end 630 coupled to body member 610 and a distal end 640. In various embodiments, proximate end 630 includes a first tapered portion 650 having an outer diameter that tapers from body member 610 toward first tubular member 620. In various embodiments, distal end 640 of tubular member 620 includes a second tapered portion 660 having an outer diameter that tapers toward distal end 640. In various embodiments, first and second tapered portions 650 and 660 extend around or at least partially around outer diameter of first tubular member 620.

In various examples of embodiments, first fitting or connector member 500 includes a second tubular member 625. In various embodiments, tubular members 620 and 625 define one or more conduits or lumens (e.g., cylindrical lumens) that are fluidly connected.

In various embodiments, second tubular member 625 has a proximate end 635 coupled to body member 610 and a distal end 645. In various embodiments, proximate end 635 includes a first tapered portion 655 having an outer diameter that tapers from body member 610 toward second tubular member 625. In various embodiments, distal end 645 of second tubular member 625 includes a second tapered portion 665 having an outer diameter that tapers toward distal end 645. In various embodiments, first and second tapered portions 645 and 665 extend around or at least partially around outer diameter of second tubular member 625.

In various embodiments, body member 610 includes a top face or surface 670 and a bottom face or surface 680. In various embodiments at least one first top notch 906 is defined by body member 510 (e.g., in top face 570). In various embodiments, first top notch 590 is defined in top face 670 near proximate end 630 of first tubular member 620. In various embodiments, first top notch 690 is defined by body member 610 (e.g., in top face 670) near proximate end 630 of first tubular member 620.

In various embodiments, a first top bevel or radius 70 is defined in body member 610. In various embodiments, first top bevel 700 is defined in top face or surface 670 and/or first tapered portion 650.

In various embodiments, first top notch 690 includes a first wall 710 and a second wall 720. In various embodiments, at least a portion of first wall 710 tapers and/or is beveled in same or similar direction or angle as first top bevel 700. In various embodiments, at least a portion of second wall 720 tapers and/or is beveled in same or similar direction or angle as first top bevel 700.

In various embodiments, at least one first or right side notch 695 is defined by body member 610 (e.g., in a first or right side face 685). In various embodiments, first or right side notch 695 is defined in first or right side face 685 near proximate end 635 of second tubular member 625. In various embodiments, first or right side notch 695 is defined by body member 610 (e.g., in first or right side face 685) near proximate end 635 of second tubular member 625.

In various embodiments, a first side bevel or radius 705 is defined in body member 610. In various embodiments, first side bevel 705 is defined in first or right side face or surface 685 and/or first tapered portion 655 of second tubular member 625.

Figure 14:
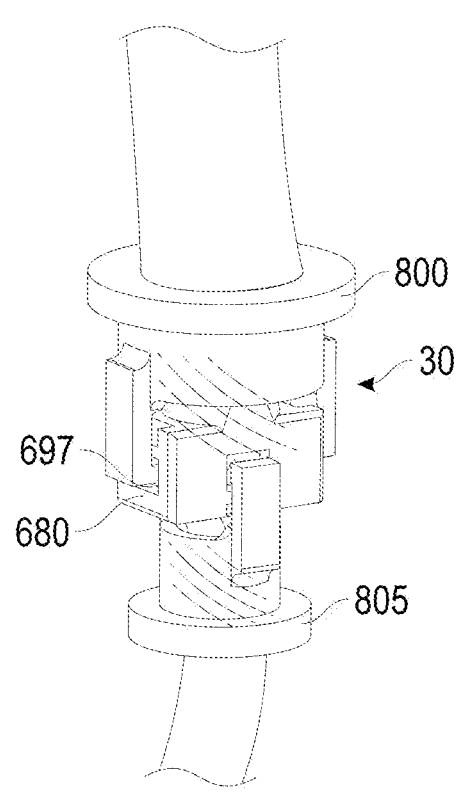
FIG. 14 illustrates a perspective view of the tubing fitting, connector and/or adaptor assembly of FIG. 12 coupled to tubing, according to various examples of embodiments.

In various embodiments, and referring now to FIGS. 13-14, at least one first bottom notch 697 is defined by body member 610 (e.g., in bottom face 680). In various embodiments, first bottom notch 697 is defined in bottom face 680 near proximate end 630 of first tubular member 620. In various embodiments, first bottom notch 697 is defined by body member 610 (e.g., in bottom face 680) near proximate end 630 of first tubular member 620. In various embodiments, at least one second or left side notch is defined by body member 610 (e.g., in a second or left side face). In various embodiments, the second or left side notch is defined in the second or left side face near proximate end 625 of second tubular member 625. In various embodiments, the second or left side notch is defined by body member 610 (e.g., in the second or left face) near proximate end 635 of second tubular member 625. In various embodiments, the notches are similar to those disclosed herein with first and second (e.g. opposing) walls beveled on angled similarly to the bevel or radius between the notches and their associated tubular member. In various embodiments, bevels or radii are provided between the notches and tubuler members as discussed above.

In various embodiments, and as illustrated in FIGS. 12-14, some or all of the tubular members 620 and 625, and/or the female fittings 800 and 905, may be different sizes (e.g., different outside or inside dimensions) or shapes. Different tubular member sizes and/or different female fitting sizes may allow a tubing connector assembly to couple (e.g., fluidly couple) relatively different size tubing (e.g., tubing of relatively different inside or outside dimensions or shapes). Such relatively differently sized components may be used in a variety of configurations (e.g., Y-configuration, linear configuration, T-configuration, L-configuration, etc.). It should also be appreciated that in various embodiments, the lumen defined in one tubular member of a male connector may be differently sized (e.g., have a different outside and/or inside diameter or dimension) or be differently shaped than one or more other lumen defined in another tubular member.

Figure 15:
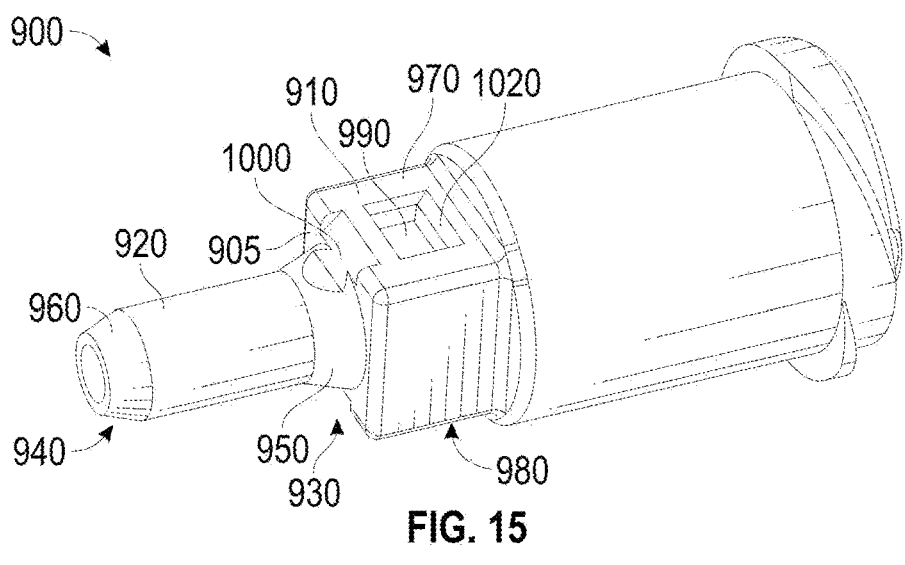
FIG. 15 illustrates a perspective view of a first fitting or connector member having a female luer lock fitting, according to various examples of embodiments.
Figure 16:
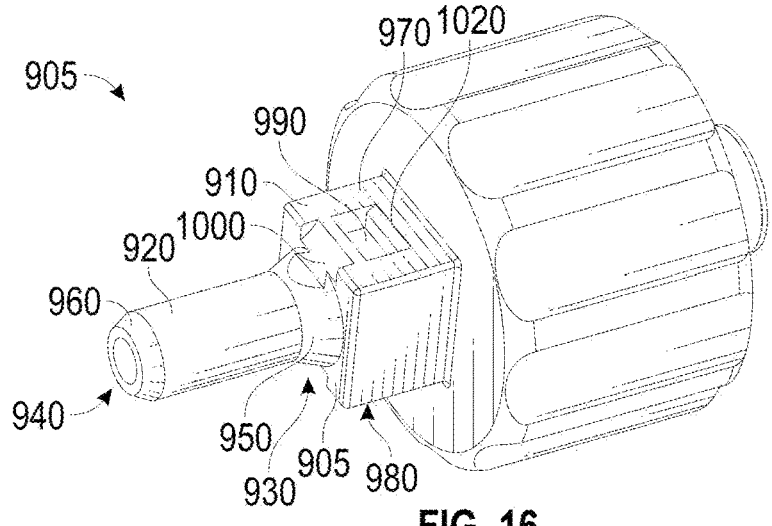
FIG. 16 illustrates a perspective view of a first fitting or connector member having a male luer lock fitting, according to various examples of embodiments.
Figure 17:
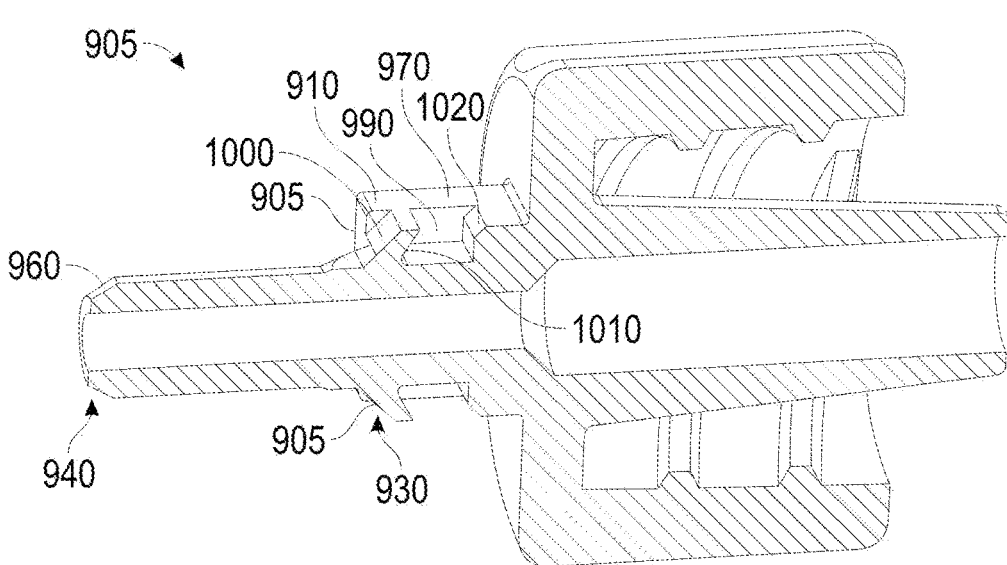
FIG. 17 illustrates a sectional view of the first fitting or connector member of FIG. 16, according to various examples of embodiments.
Figure 18:
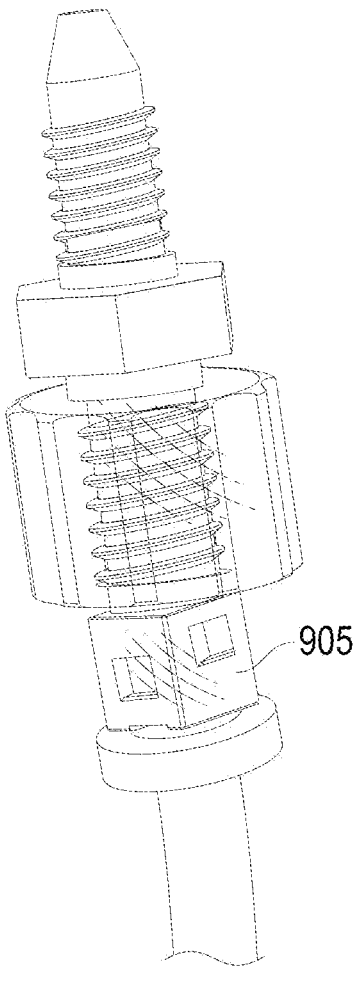
FIG. 18 illustrates a perspective view of a tubing fitting, connector and/or adaptor assembly having the first fitting or connector member of FIG. 16 and coupled to tubing, according to various examples of embodiments.

Referring now to FIG. 15-18, a first or male fitting or connector member 900/905 are illustrated. In various examples of embodiments, first fitting or connector member 900/905 includes a hub or body member 910 and a first tubular member 920 extending from a first side 905 of hub 910. In various examples of embodiments, a luer fitting or lock component is couple to and/or extends from a second side of hub member 910. In various embodiments, the connector assembly may include a male luer lock (e.g., as illustrated in FIG. 15) and/or a female luer lock (e.g., as illustrated in FIGS. 16-18) that are configured to be threaded or otherwise coupled together or to other luer locks.

In various embodiments, first tubular member 920 has a proximate end 930 coupled to body member 910 and a distal end 940. In various embodiments, proximate end 930 includes a first tapered portion 950 having an outer diameter that tapers from body member 910 toward first tubular member 920. In various embodiments, distal end 940 of tubular member 920 includes a second tapered portion 960 having an outer diameter that tapers toward distal end 940 and/or away from proximate end 930. In various embodiments, first and second tapered portions 950 and 960 extend around or at least partially around outer diameter of first tubular member 920.

In various embodiments, body member 910 includes a top face or surface 970 and a bottom face or surface 980. In various embodiments at least one first top notch 990 is defined by body member 910 (e.g., in top face 970). In various embodiments, first top notch 990 is defined in top face 970 near proximate end 930 of first tubular member 920. In various embodiments, first top notch 990 is defined by body member 910 (e.g., in top face 970) near proximate end 930 of first tubular member 920.

In various embodiments, a first top bevel or radius 1000 is defined in body member 910. In various embodiments, first top bevel 1000 is defined in top face or surface 970 and/or first tapered portion 950.

In various embodiments, first top notch 990 includes a first wall 1010 and a second wall 1020. In various embodiments, at least a portion of first wall 1010 tapers and/or is beveled in same or similar direction or angle as first top bevel 1000. In various embodiments, at least a portion of second wall 1020 tapers and/or is beveled in same or similar direction or angle as first top bevel 1000.

In various embodiments, a second or female fitting or connector member as disclosed above may be utilized in connection and/or relation to the first or male fitting or connector member 900/905.

In various embodiments of the tubing fitting, adaptor and/or connector assemblies disclosed herein, the second receiving end of the female fitting is adapted to receive the tubular member of the male or first fitting or connector member. In operation, in various embodiments, a section or end of tubing is provided in the cavity or channel formed in and/or defined by the female fitting. In various embodiments, the section of end of the tubing has an inner diameter that is provided around an outside diameter of a tubular member. In various examples of embodiments, the male or first fitting or connector member and the female fitting are coupled relative to each other by generally aligning the tubular member of the male or first fitting or connector member with the second receiving end of the female fitting. In various embodiments, the tubular member is inserted into the second receiving end and the male or first fitting or connector member and the female fitting are pushed or moved together. As the male or first fitting or connector member and female fitting are pushed together, a cam surface of a cantilever arm engages the hub and the resilient cantilever arm initially pivots away from the hub until the male or first fitting or connector member and female fitting are sufficiently moved together that the cantilever snap tab seats into the one of the notches or openings defined in the hub of the male or first fitting or connector member for receiving the cantilever hook or tab. As best illustrated in FIG. 7, once the hook or tab is fully seated in the opening, the resilient cantilever arm returns under resilient memory to a home position so that notch or opening engages the hook or tab thereby releasably coupling or locking the female fitting relative to the male or first fitting or connector member. In various embodiments, the fixed protrusion of the female fitting and outside dimension of the tubular member of the male or first fitting or connector member oppose each other and clamp near the end of the tubing while compressing the tubing in a radial direction.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A tubing connector assembly comprising:
a hub having opposing top and bottom surfaces, a first top notch defined in the top surface and a first bottom notch defined in the bottom surface;
a first tubular member extending from the hub, the first tubular member having an outer diameter adapted to engage an inner diameter of a first tubing;
a first female fitting comprising a body member having first and second cantilever extending arms extending from the body member;
whereby the body member of the first female fitting has opposing first and second receiving ends, an inner diameter defining a cavity connecting the first and second receiving ends, and a protrusion protruding radially into the cavity from the inner diameter;
whereby the inner diameter of the body member of the first female fitting is adapted to receive an outer diameter of said first tubing engaged by the outer diameter of the first tubular member, and whereby first and second extending arms of the first female fitting each have a hook coupled thereto adapted to releasably engage the first top notch and the first bottom notch to help retain the first female fitting relative to the first tubular member;
one of a second top notch defined in the top surface and a second bottom notch defined in the bottom surface or a first side notch defined in a first side surface of the hub and a second side notch defined in a second side surface of the hub;
a second tubular member extending from the hub, the second tubular member having an outer diameter adapted to engage an inner diameter of a second tubing;
a second female fitting comprising a body member having first and second cantilever extending arms extending from the body member;
whereby the body member of the second female fitting has opposing first and second receiving ends, an inner diameter defining a cavity connecting the first and second receiving ends, and a protrusion protruding radially into the cavity from the inner diameter; and
whereby the inner diameter of the body member of the second female fitting is adapted to receive an outer diameter of said second tubing engaged by the outer diameter of the second tubular member, and whereby first and second extending arms of the second female fitting each have a hook coupled thereto adapted to releasably engage one of the second top notch and the second bottom notch or the first side notch and the second side notch to help retain the second female fitting relative to the second tubular member.

2. The tubing connector assembly of claim 1, further comprising a female luer fitting coupled to the hub.

3. The tubing connector assembly of claim 1, further comprising a male luer fitting coupled to the hub.

4. The tubing connector assembly of claim 1, whereby the first and second tubular members are linearly aligned.

5. The tubing connector assembly of claim 1, whereby the first and second tubular members extend from the hub to form an L-configuration.

6. The tubing connector assembly of claim 1, whereby the first and second tubular member are differently sized relative to each other and/or the first and second female fittings are differently sized relative to each other.

7. The tubing connector assembly of claim 1, further comprising:

one of the second top notch and the second bottom notch or a third top notch defined in the top surface and a third bottom notch defined in the top surface;

a third tubular member extending from the hub, the third tubular member having an outer diameter adapted to engage an inner diameter of a third tubing;

a third female fitting comprising a body member having first and second cantilever extending arms extending from the body member;

whereby the body member of the third female fitting has opposing first and second receiving ends, an inner diameter defining a cavity connecting the first and second receiving ends, and a protrusion protruding radially into the cavity from the inner diameter; and whereby the inner diameter of the body member of the third female fitting is adapted to receive an outer diameter of said third tubing engaged by the outer diameter of the third tubular member, and whereby first and second extending arms of the third female fitting each have a hook coupled thereto adapted to releasably engage one of the second top notch and the second bottom notch or the third top notch and the third bottom notch to help retain the third female fitting relative to the third tubular member.

8. The tubing connector assembly of claim 7, whereby the first, the second and the third tubular members extend from the hub to form a T-configuration.

9. The tubing connector assembly of claim 7, whereby the first, the second and the third tubular members extend from the hub to form a Y-configuration.

10. The tubing connector assembly of claim 7, whereby at least two of the female fittings are color coded.

11. The tubing connector assembly of claim 7, whereby at least two of tubular members are differently sized relative to each other and/or two of the female fittings are differently sized relative to each other.

12. The tubing connector assembly of claim 1, whereby the female fittings are color coded.

13. A method of fluidly coupling sections of tubing, the method comprising:

using the tubing connector assembly of claim 1 for coupling one or more of the first tubing and the second tubing;

providing one of the first female fitting and the second female fitting;

providing a male fitting having the hub having the opposing top and bottom surfaces with the notch defined in each surface, and one of the first tubular member and the second tubular member extending from the hub;

providing one of the first tubing and the second tubing having an end portion in the cavity defined by one of the first female fitting and the second female fitting;

providing the inner diameter of the end portion of one of the first tubing and the second tubing around the outer diameter of one of the first tubular member and the second tubular member;

and releasably coupling the male fitting, the respective female fitting, and respective tubing relative to each other by generally aligning the respective tubular member with one of the receiving ends of the respective female fitting, inserting the respective tubular member and respective tubing end portion into one of the receiving ends of the respective female fitting and moving the male and the respective female fitting relatively closer together until the hooks of the first and second extending arms seat into the notches defined in the opposing top and bottom surfaces of the hub of the male fitting, and the protrusion of the respective female fitting and the outer diameter of the respective tubular member oppose each other to compress the end portion of the respective tubing in a radial direction to help clamp the end portion of the respective tubing relative to the respective tubular member.

* * * * *